US012727548B2

(12) United States Patent
Wandel

(10) Patent No.: US 12,727,548 B2
(45) Date of Patent: Sep. 8, 2026

(54) STRAW PROCESSING SYSTEM

(71) Applicant: Wantech Pty Ltd., Scaddan (AU)

(72) Inventor: Mark Wandel, Scaddan (AU)

(73) Assignee: Wantech Pty Ltd., Scaddan (AU)

(*) Notice: Subject to any disclaimer, the term of this patent is extended or adjusted under 35 U.S.C. 154(b) by 367 days.

(21) Appl. No.: 18/281,190

(22) PCT Filed: Mar. 15, 2022

(86) PCT No.: PCT/AU2022/050223

§ 371 (c)(1),
(2) Date: Sep. 8, 2023

(87) PCT Pub. No.: WO2022/192945

PCT Pub. Date: Sep. 22, 2022

(65) Prior Publication Data

US 2024/0147913 A1 May 9, 2024

(30) Foreign Application Priority Data

Mar. 16, 2021 (AU) ................................ 2021900749

(51) Int. Cl.
*A01F 29/12* (2006.01)
*A01D 41/12* (2006.01)
(Continued)

(52) U.S. Cl.
CPC .......... *A01F 29/12* (2013.01); *A01D 41/1243* (2013.01); *A01D 43/08* (2013.01);
(Continued)

(58) Field of Classification Search
CPC ...... A01F 29/12; A01F 12/385; A01F 29/005; A01F 29/04; A01F 29/01; A01F 29/00;
(Continued)

(56) References Cited

U.S. PATENT DOCUMENTS 2,701,596 A * 2/1955 Myrold .................. A01F 12/40
241/236
2,708,582 A * 5/1955 Adams .................. A01F 12/40
239/650

(Continued)

FOREIGN PATENT DOCUMENTS

CA 2159689 A1 * 3/1996 ........... B07B 13/116
DE 2805208 A1 * 8/1979 ............ A01F 12/40

(Continued)

OTHER PUBLICATIONS

International Search Report of Jun. 14, 2022 for PCT/AU2022/050223.

*Primary Examiner* — Joseph M Rocca
*Assistant Examiner* — Sunny D Webb
(74) *Attorney, Agent, or Firm* — GrayRobinson, P.A.

(57) ABSTRACT

A straw processing system includes a straw pickup assembly, a straw chopper, and a straw distribution system. The straw pickup assembly picks up straw and passes it to the straw chopper for producing a straw feed stream flowing in a feed direction. The straw distribution system has a chamber with a feed inlet for receiving the straw feed stream, a central outlet, and at least a first outlet. The straw distribution system diverts at least a first fraction of straw from the straw feed into the first outlet in a first direction which is divergent from the feed direction. The central outlet discharges a fraction of the straw feed stream that continues to flow in the feed direction.

30 Claims, 13 Drawing Sheets

(51) Int. Cl.

| | |
|---|---|
| ***A01D 43/077*** | (2006.01) |
| ***A01D 43/08*** | (2006.01) |
| ***A01F 12/40*** | (2006.01) |
| ***A01F 29/00*** | (2006.01) |
| ***A01F 29/01*** | (2006.01) |
| ***A01F 29/04*** | (2006.01) |

(52) U.S. Cl.
CPC .......... *A01D 43/086* (2013.01); *A01F 29/005* (2013.01); *A01F 29/04* (2013.01); *A01D 43/077* (2013.01); *A01F 12/40* (2013.01); *A01F 29/01* (2013.01)

(58) Field of Classification Search
CPC .......... A01F 29/06; A01F 12/39; A01F 12/40; A01D 43/08; A01D 41/1243; A01D 90/10; A01D 43/077; A01D 43/086; A01D 43/087; A01D 90/12
USPC ........... 460/111, 901, 70, 112, 109; 241/222, 241/101.742, 186.3, 239; 56/192, 122; 239/680
See application file for complete search history.

(56) References Cited

U.S. PATENT DOCUMENTS

| | | | | |
|---|---|---|---|---|
| 3,149,449 | A * | 9/1964 | Mulder | A01F 12/40 56/192 |
| 3,338,037 | A * | 8/1967 | Bauer | A01D 43/08 56/2 |
| 4,131,237 | A * | 12/1978 | van der Lely | A01C 17/00 239/666 |
| 5,021,030 | A * | 6/1991 | Halford | A01D 41/1243 460/111 |
| 5,232,405 | A * | 8/1993 | Redekop | A01F 12/40 56/505 |
| 5,992,759 | A * | 11/1999 | Patterson | A01M 7/0075 239/168 |
| 6,840,853 | B2 * | 1/2005 | Foth | A01F 12/40 460/111 |
| 6,840,854 | B2 * | 1/2005 | Redekop | A01F 12/40 460/112 |
| 7,001,269 | B2 * | 2/2006 | Weichholdt | A01F 12/40 460/112 |
| 7,510,472 | B1 * | 3/2009 | Farley | A01D 90/04 460/112 |
| 8,105,140 | B2 * | 1/2012 | Teroerde | A01D 41/1243 460/112 |
| 9,462,799 | B2 * | 10/2016 | Bouten | A01M 7/0075 |
| 9,642,312 | B2 * | 5/2017 | Graham | A01D 87/0007 |
| 9,801,339 | B2 * | 10/2017 | Roberge | A01D 41/1243 |
| 10,420,277 | B2 * | 9/2019 | Holmen | A01D 41/1243 |
| 2004/0137974 | A1 | 7/2004 | Weichholdt | |
| 2010/0311481 | A1 | 12/2010 | Ritter | |
| 2013/0324199 | A1 | 12/2013 | Roberge et al. | |

FOREIGN PATENT DOCUMENTS

| | | | | |
|---|---|---|---|---|
| DE | 202014102621 | U1 * | 6/2015 | A01D 41/1243 |
| EP | 0212270 | A1 * | 3/1987 | A01D 41/1243 |
| EP | 1208737 | A1 * | 5/2002 | A01F 12/40 |
| EP | 2225929 | A1 * | 9/2010 | A01D 80/02 |
| EP | 3338527 | A1 | 6/2018 | |
| EP | 3000303 | B1 * | 5/2023 | A01D 41/1278 |
| GB | 2163633 | A * | 3/1986 | A01C 15/00 |
| SE | 520354 | C2 * | 7/2003 | A01F 12/40 |
| SU | 481419 | A1 | 8/1975 | |
| WO | WO-0078126 | A1 * | 12/2000 | A01F 12/40 |
| WO | WO-2018170594 | A1 * | 9/2018 | A01M 9/003 |

* cited by examiner 14
76
78
74
15x
M
M
M
15x
82
80
M
20
42
26
28
15y 16
18
22,24
30

15x
74
76
32
16
92

90
12
76
15x
80
15x
15y
86
12
92
90

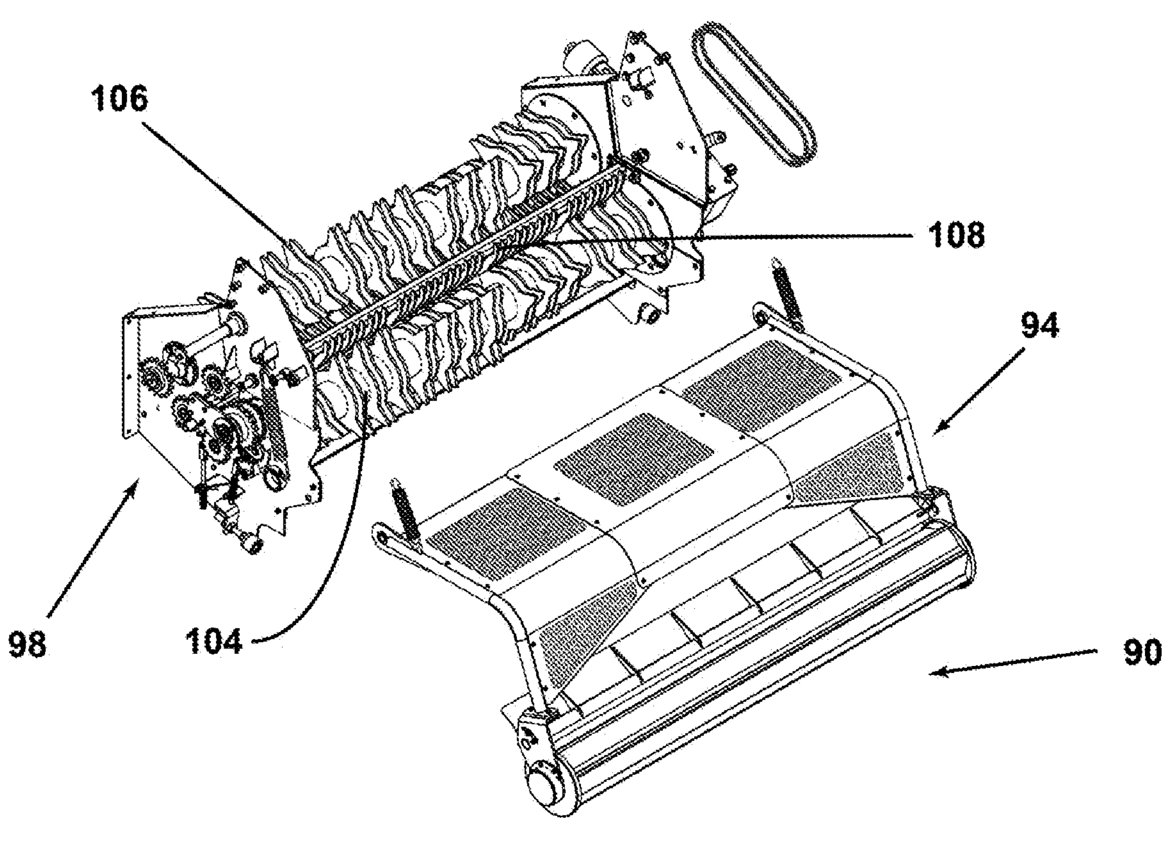
Fig 9
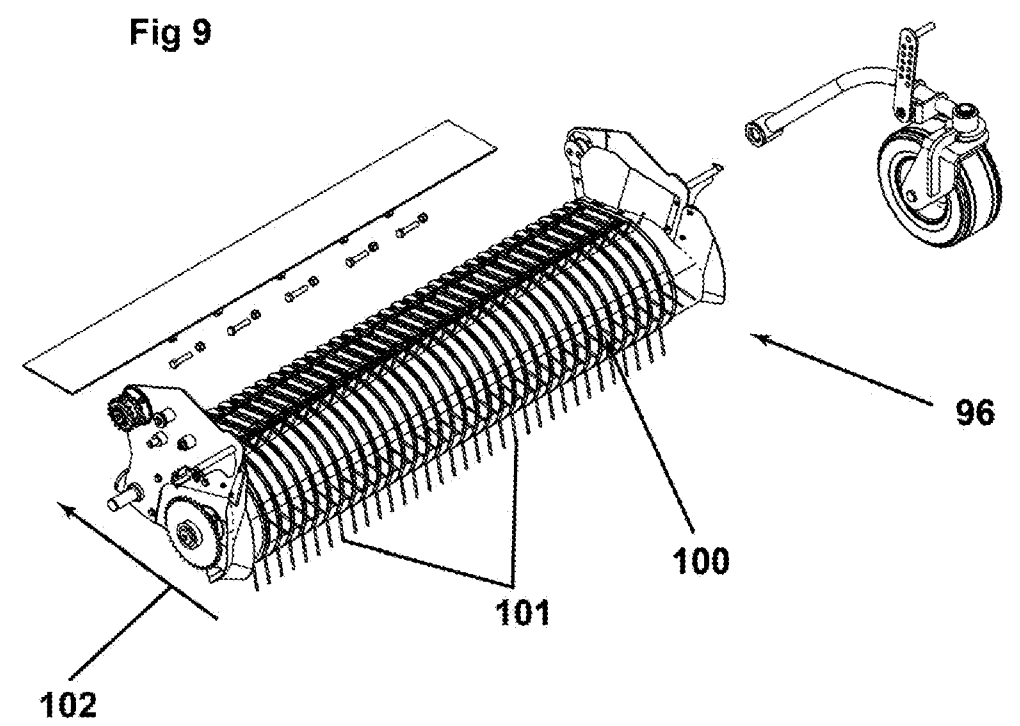

STRAW PROCESSING SYSTEM

CROSS-REFERENCE TO RELATED APPLICATIONS

This is the U.S. National Stage application of International Application No. PCT/AU2022/050223, filed Mar. 15, 2022, which claims the benefit of priority to Australian patent Application No. 2021900749, filed Mar. 16, 2021. The entire contents of these prior applications are incorporated by reference herein.

TECHNICAL FIELD

A straw processing system is disclosed. The straw processing system has particular, but not exclusive, application in the processing of windrowed straw following the harvesting of a crop.

BACKGROUND

A combine harvester as a number of components or systems working together to harvest a grain bearing crop. These include a header, thresher, straw walker/conveyor and a grain cleaner. The header is at the front end of the harvester and cuts the stems of the crop. The cut crop is fed into the thresher which separates the grain and chaff from the straw. This produces two streams of material: a straw stream; and, a grain and chaff stream.

The grain and chaff stream flow beneath the straw stream to a grain cleaner which separates the grain from the chaff. The grain cleaner often comprises two sieves, one above the other. The grain falls through the sieves into a sump from where it is lifted by an auger to a grain tank. The combination of a fan and the motion of the sieves transport the chaff to a rear of the combine where it can be dropped or spread onto the ground or otherwise processed for example by passing through a mechanical seed devitalization mechanism.

The straw stream is moved toward a backend of the combine by the straw walker/conveyor. It is common for combines to include a straw chopper which chops the straw in the straw stream into smaller pieces. The chopped straw may be either dropped directly onto the ground (i.e., windrowed) or fed to a straw spreader which attempts to spread the straw over the width of the backend of the combine. Alternately for combines without a straw chopper the threshed straw is windrowed.

Current straw spreaders have considerable difficulty in spreading the straw evenly across the 12 m harvested width of a contemporary combine header in all weather conditions. With the recent development of using 18 m wide headers, the even spreading of the straw in is not possible with current known spreading technology.

The above references to the background art do not constitute an admission that the art forms a part of the common general knowledge of a person of ordinary skill in the art. The above references are also not intended to limit the application of the disclosed straw processing system to any particular type of crop.

SUMMARY OF THE DISCLOSURE

In one aspect there is disclosed a straw processing system comprising:

a straw distribution system having a chamber with a feed inlet for receiving a straw feed stream flowing in a feed direction and at least a first outlet formed in the chamber wherein the straw distribution system is operable to divert at least a first fraction of straw from the straw feed stream received in the feed inlet to flow into the first outlet in a first direction which is divergent from the feed direction.

In one aspect the straw distribution system at least a second outlet formed in the chamber and the straw distribution system is operable to divert at least a second fraction of the straw from the straw feed stream to flow into the second outlet in a second direction which is divergent from the first direction and the feed direction.

In one embodiment the straw distribution system includes a central outlet wherein the central outlet is located downstream of the feed inlet in the feed direction.

In one embodiment the straw distribution system includes a third outlet formed in the chamber and the straw distribution system is operable to divert at least a third fraction of the straw from the straw feed stream to flow into the third outlet in third direction which is divergent from the feed direction.

In one embodiment the straw distribution system includes a fourth outlet formed in the chamber and the straw distribution system is operable to divert at least a fourth fraction of the straw from the straw feed stream to flow into the fourth outlet in a fourth direction which is divergent from the feed direction.

In one embodiment the first direction and the third direction are substantially parallel to each other.

In one embodiment the second direction and the fourth direction are substantially parallel to each other.

In one embodiment straw distribution system comprises a plurality of surfaces depending from an upper inside surface of the chamber.

In one embodiment at least two of the surfaces meet to form a common edge.

In one embodiment the at least two surfaces are mutually diverted from the common edge when viewed downstream with reference to the feed direction.

In one embodiment the plurality of surfaces comprises a plurality of spaced apart guide surfaces depending from the upper inside surface of the chamber.

In one embodiment the guide surfaces are adjustably supported on the chamber in a manner to allow adjustment of an orientation of the guide surfaces relative to the feed direction.

In one embodiment the straw processing system comprises an adjustment mechanism operable from an outside of the chamber for adjusting the orientation of the guide plates.

In one embodiment the straw processing system comprises a plurality of vacuum sources one of each in fluid communication with respective outlets, wherein the vacuum sources are operable to draw a fraction of straw associated with the outlet to a discharge point from where the straw in the stream is ejected from straw processing system.

In one embodiment at least one of the discharge points is laterally offset from a line coincident with the feed direction.

In one embodiment the straw processing system comprises a plurality of chutes wherein each chute extends from a corresponding outlet, and at least one vacuum source is provided at an end of the chute distal the corresponding outlet, the end of the chute forming an associated one of the discharge points.

In one embodiment each chute is provided with a conveyor arranged to assist in transporting straw to the discharge point associated with that chute.

In one embodiment the straw processing system comprises a chute deployment system operable to selectively move the chutes between an operational position where the chutes are in communication with the respective outlets to enable straw to flow along a chute to an associated discharge point; and a transport position where a longitudinal axis of a corresponding chute is substantially parallel to the feed direction.

In one embodiment the straw processing system comprises a straw chopper upstream of the straw distribution system, wherein the straw chopper comprises at least one shredder rotor arranged to chop straw and produce the straw feed stream received by the feed inlet of the chamber.

In one embodiment the straw chopper comprises a first shredder rotor and a second shredder rotor arranged to rotate about mutually parallel axes and wherein the second shredder rotor is downstream of the first shredder rotor whereby straw chopped by the first shredder rotor subsequently passes to the second shredder rotor.

In one embodiment the second shredder rotor rotates at a speed greater than the first shredder rotor.

In one embodiment the first shredder rotor is provided with a first arrangement of blades and the second shredder rotor is provided with a second arrangement of blades wherein the first arrangement of blades is different to the second arrangement of blades.

In one embodiment the first arrangement of blades includes a first number of thrower blades, and the second arrangement of blades includes a second number of thrower blades and wherein the second arrangement of thrower blades is more than the first number of thrower arrangement of blades, and wherein each thrower blade comprises a straw cutting edge lying in a first plane and a fan or thrower portion lying in a plane perpendicular to the first plane.

In one embodiment wherein the chopper comprises a housing and a replaceable wear liner seated in the housing.

In one embodiment the straw chopper comprises a cover operable to move between a closed position where the cover closes the housing, and an opened position where the cover is moved away from the housing to allow access to the one or more shredder rotors.

In one embodiment the straw chopper includes a plurality of deflector plates arranged to deflect straw chopped by the first shredder rotor towards respective ends of the second shredder rotor.

In one embodiment the straw processing system comprises a ramp arranged to deflect straw chopped by the straw chopper toward an upper region of the feed inlet.

In a second aspect there is disclosed a straw chopper for use in a ground traversing agricultural machine, comprising a first shredder rotor and a second shredder rotor arranged to rotate about mutually parallel axes and wherein the second shredder rotor is downstream of the first shredder rotor and wherein straw chopped by the first shredder rotor subsequently passes to the second shredder rotor.

In one embodiment the second shredder rotor rotates at a speed greater than the first shredder rotor.

In one embodiment the first shredder rotor is provided with a first arrangement of blades and the second shredder rotor is provided with a second arrangement of blades wherein the first arrangement of blades is different to the second arrangement of blades.

In one embodiment the first arrangement of blades includes a first number of thrower blades, and the second arrangement of blades includes a second number of thrower blades and wherein the second number of thrower blades is more than the first number of thrower blades, and wherein each thrower blade comprises a straw cutting edge lying in a first plane and a fan or thrower portion lying in a plane perpendicular to the first plane.

In one embodiment the straw chopper comprises a housing and a replaceable wear liner seated in the housing.

In one embodiment the straw chopper comprises a cover operable to move between a closed position where the cover closes the housing, and an opened position where the cover is moved away from the housing to allow access to the one or more shredder rotors.

In one embodiment the straw chopper comprises a plurality of deflector plates arranged to deflect straw chopped by the first shredder rotor towards respective axial ends of the second shredder rotor.

In one embodiment the straw chopper comprises a ramp arranged to deflect straw chopped by the straw chopper toward an upper region of the feed inlet of a straw processing system.

BRIEF DESCRIPTION OF THE DRAWINGS

Notwithstanding any other forms which may fall within the scope of the straw processing system as set forth in the Summary, specific embodiments will now be described, by way of example only, with reference to the accompanying drawings in which:

FIG. 9 is an exploded view of a pickup assembly incorporated in an embodiment of the disclosed straw processing system.

DETAILED DESCRIPTION OF SPECIFIC EMBODIMENTS

Embodiments of the disclosed straw processing system (SPS) 10 are designed to spread straw substantially evenly over a width of up to about 18 m. In the presently described embodiment the SPS 10 is mounted on a trailer 12 and towed by another vehicle such as a tractor. However, it is envisaged that the SPS 10 could be mounted on a tray or chassis of a vehicle.

In a typical combine harvester fitted with a straw chopper and a straw spreader the straw flow within the combine downstream of the thresher to a discharge location on the combine stays the same. Indeed, current design philosophy is to keep the straw flowing in a constant direction through the combine to maximise throughput and avoid changes in flow direction. Once the straw reaches the discharge location it may be thrown rearwardly and laterally by a tailboard or spinners.

In contrast, and in general terms, an embodiment of the disclosed SPS 10 operates to divert at least some of the straw presented in a straw feed stream into one or more flow paths that diverge from a feed direction. As a result, the SPS 10 has one or more discharge points from which the straw leaves the SPS 10 that are laterally offset or spaced from the straw flow direction. Moreover, the SPS 10 creates one or more internal straw flow streams that are divergent from the feed direction.

Figure 4:
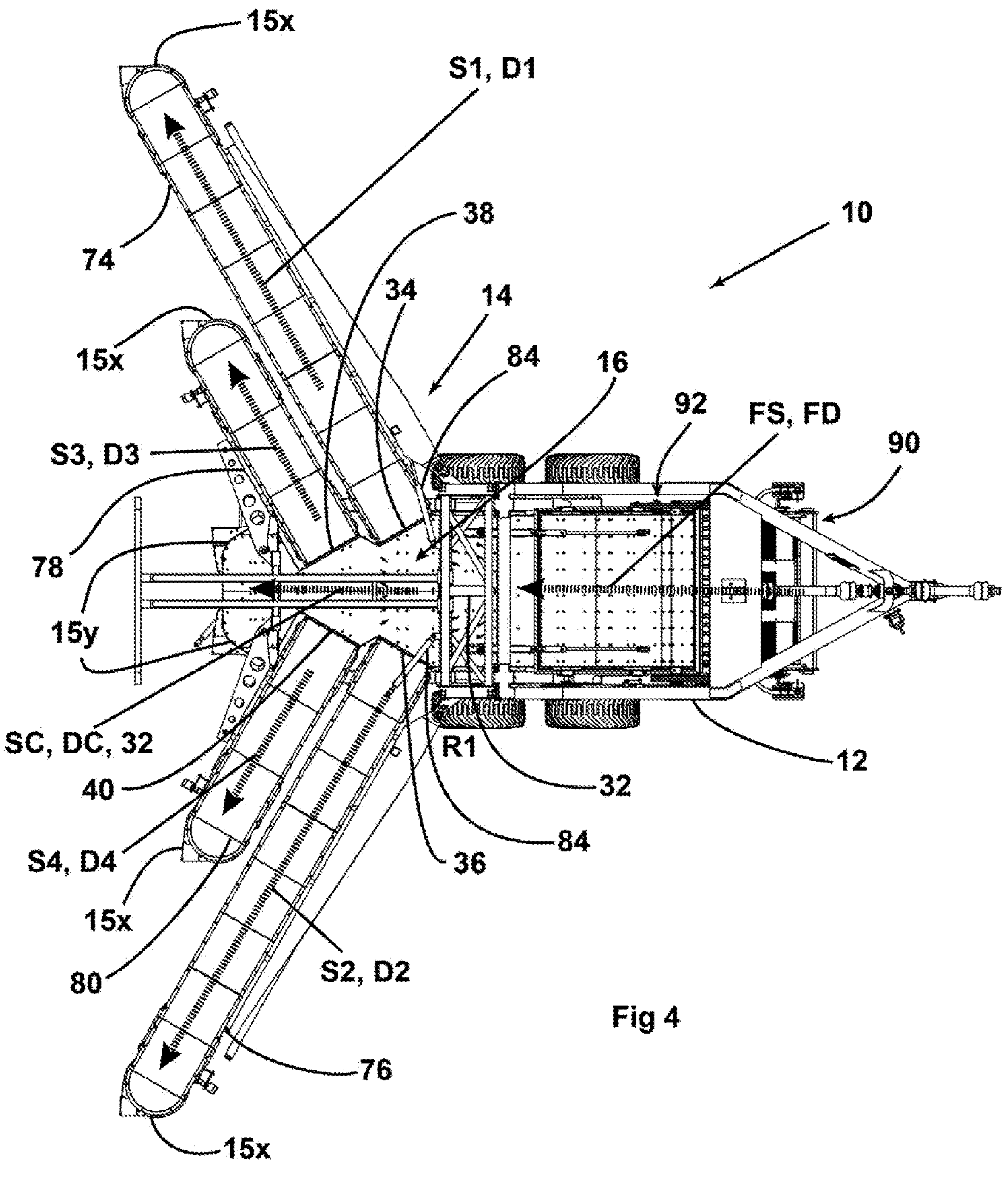
FIG. 4 is a plan view of the straw processing system when in an operational configuration.
Figure 5A:
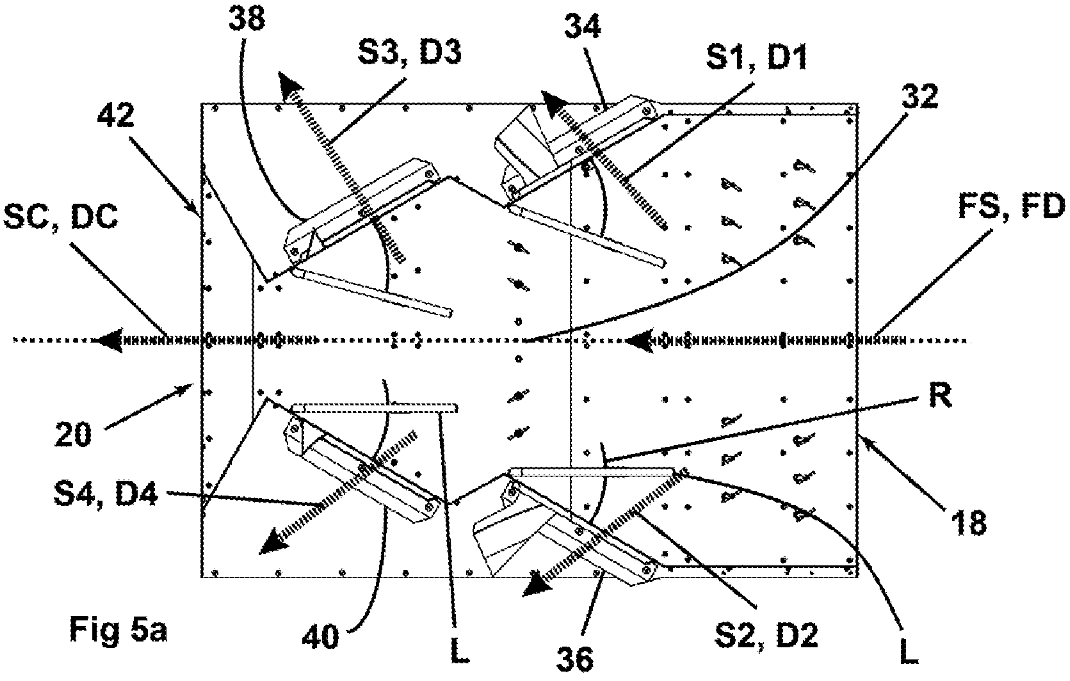
FIG. 5*a* is a plan view of a flow distribution system and associated chamber incorporated in the disclosed embodiment of the straw processing system.

The SPS 10 includes a straw distribution system 14 which is presented with a feed stream of straw FS flowing in a feed direction FD as shown in FIGS. 4 and 5*a*. The feed direction FD is parallel to the direction of travel of the SPS 10 over the ground. This coincides with a longitudinal central line of the trailer 12. The straw distribution system 14 in this embodiment selectively divides the feed stream FS into multiple fractions or streams where at least one fraction or stream flows in a direction which is divergent from the feed direction FD. When providing a maximum lateral spread of straw, the straw distribution system 14 divides the feed stream FS into five discharge streams: S1, S2, S3, S4, and SC which flow in directions D1, D2, D3, D4 and DC respectively. Each of the directions D1-D4 is divergent from the feed direction FD. The flow direction DC of the straw stream SC flows in a direction coincident with (and thus parallel to) the feed direction FD.

The straw streams S1-SC continue to flow in their corresponding directions until they reach respective discharge points on the SPS 10. At the discharge points negative pressure or vacuum sources in the form of fans or blowers 15 assist in inducing a flow of straw out from the straw distribution system 14. The fans 15 are at the discharge points on the SPS 10 and also act to accelerate the straw away from the SPS 10 and provide a generally even spread of straw in a lateral direction (i.e., transverse to the direction of travel of the trailer 12). The idea here is that the straw is spread evenly across the width of the header of the combine used to harvest the crop that generated the windrowed straw processed by the SPS 10.

Figure 5B:
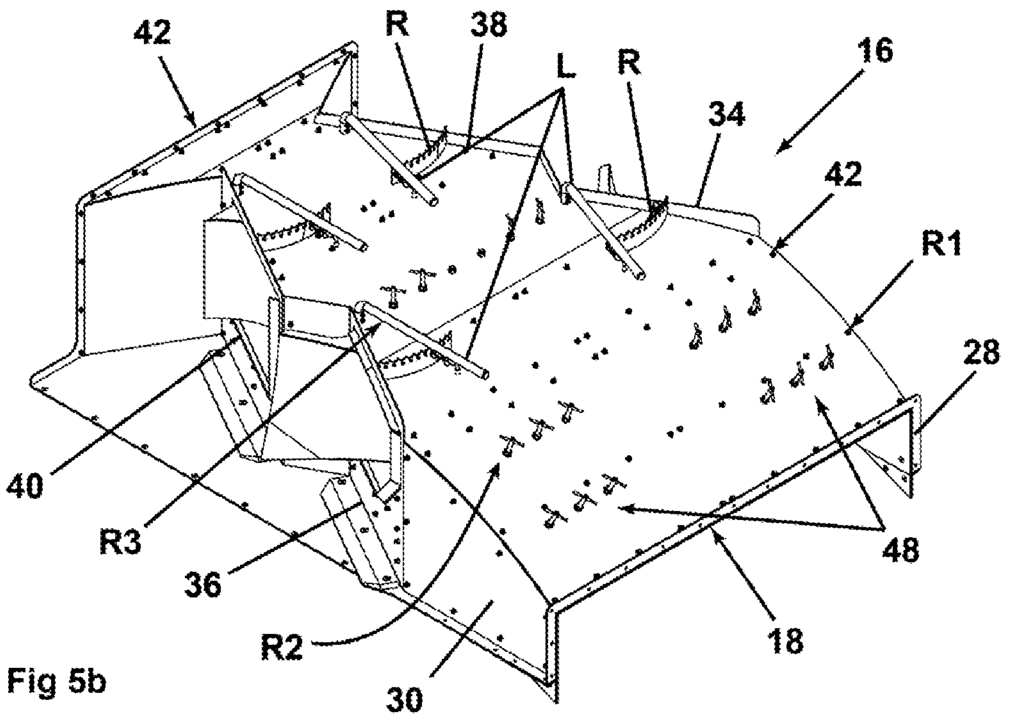
FIG. 5*b* is a perspective view from above of a hood of the chamber shown in FIG. 5*a;*
Figure 5C:
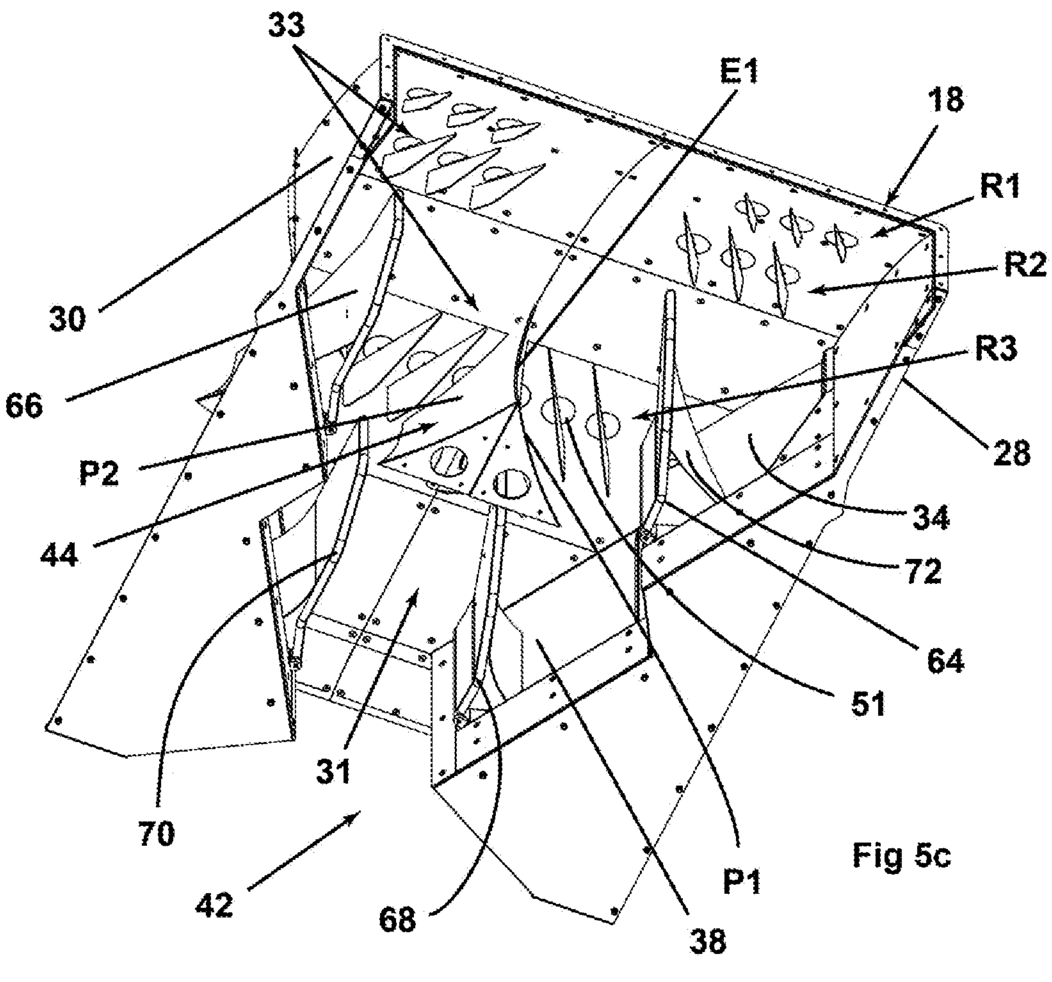
FIG. 5*c* is a perspective view from an underside of the hood shown in FIG. 5*b;*
Figure 5D:
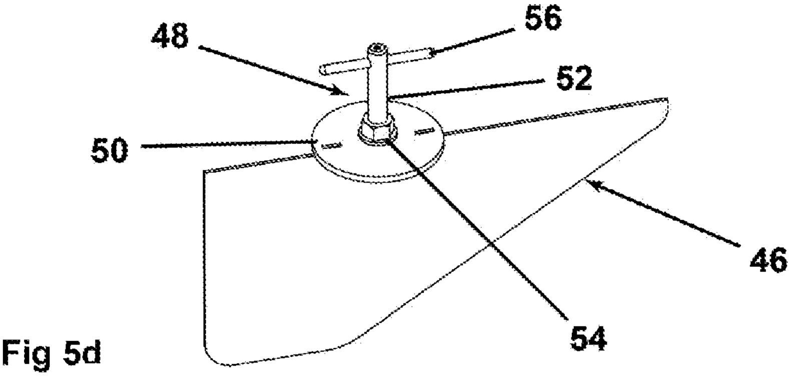
FIG. 5*d* is a representation of one form of guide surface incorporated the flow distribution system.
Figure 6:
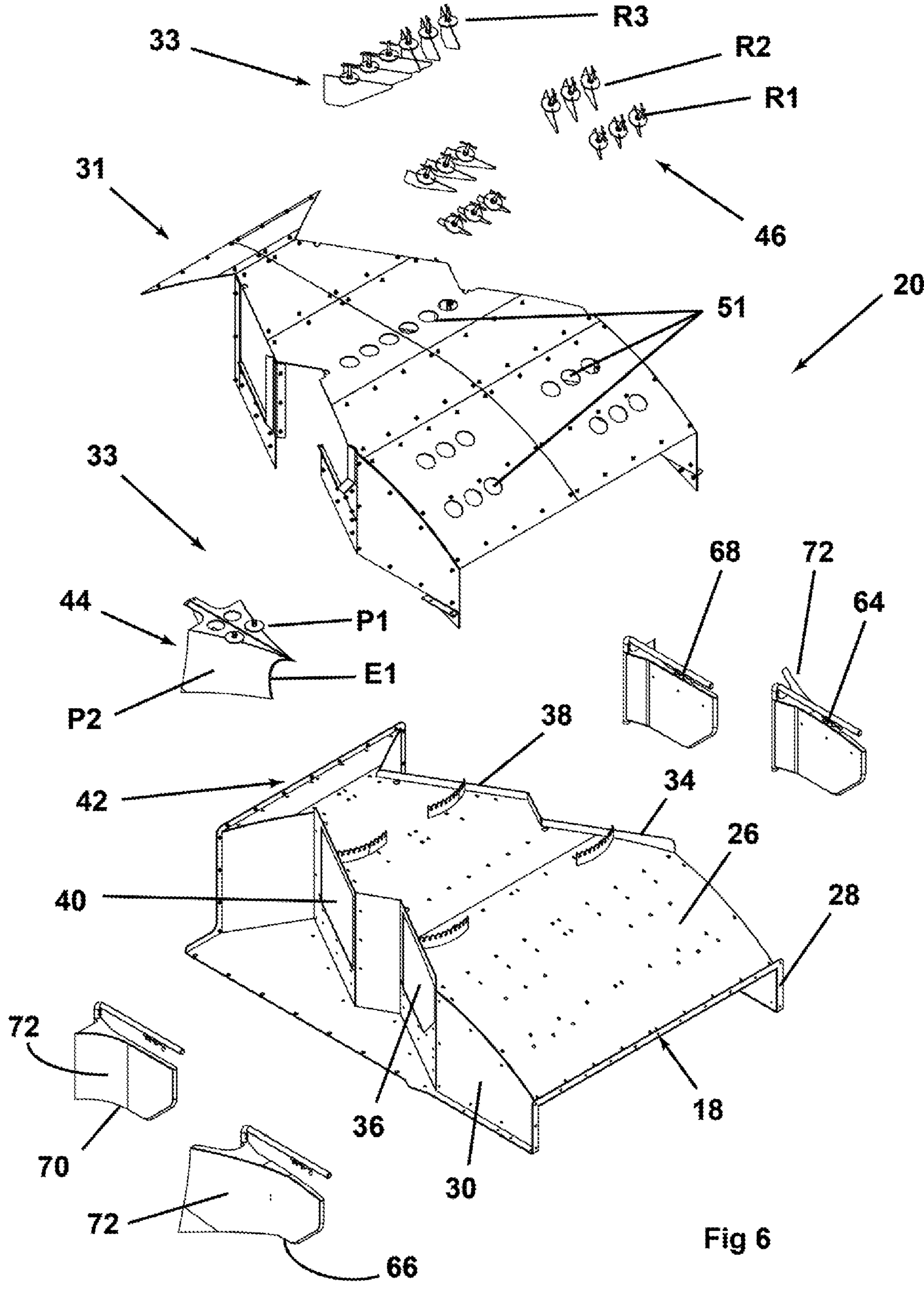
FIG. 6 is an exploded view of a portion of the chamber of the flow distribution system and showing the hood of the chamber, an interior liner for the hood, doors for controlling the flow of material through openings in the hood, and guide surfaces forming the flow distribution system including a plough like structure for creating divergent flows of material.

With particular reference to FIGS. 5*a*-6, at the heart of the straw distribution system 14 is a chamber 16 which has a feed inlet 18 for receiving the straw feed stream FS flowing in the feed direction FD. The chamber 16 is made up of a cover or hood 20 and a floor 22. The floor 22 is in the form of a conveyor belt 24 (see FIG. 1). The hood 20 has an upper wall 26 and opposite side walls 28 and 30. A liner 31 (see FIGS. 5*c* and 6) is coupled to an inside surface of the hood 20. The surface of the liner 31 exposed to the chamber 16 forms the inside surface of the upper wall 26. The chamber 16 has a longitudinal central axis 32 running parallel to the feed direction FD. Inside the chamber is a flow distribution system 33 that divides the straw from the feed stream FS into the discharge streams S1-SC. As explained in greater detail later the flow distribution system 33 is formed from a plurality of surfaces that lie in the feed stream flow path.

Starting at the feed inlet 18 and moving in the downstream direction with reference to the feed direction FD, the chamber 16 has first and second outlets 34 and 36 one on each side of the central axis 32. The first and second outlets 34 and 36 are symmetrically arranged about the axis 32. Continuing in the downstream direction the chamber 16 has third and fourth outlets 38 and 40. The third and fourth outlets 38 and 40 are symmetrically arranged about the axis 32. A fifth outlet 42 is formed in the chamber 16. The fifth outlet 42 receives a fraction of the feed stream straw which has not previously been diverted into one of the first to fourth outlets, i.e., straw that continues to flow in the feed direction FD The outlets 34 and 38 are formed in the side wall 28 and the outlets 36 and 40 are formed in the side wall 30. The inlet 18 is generally rectangular in shape and bounded on three sides by the hood 20, and on a bottom side by the conveyor 24. Similarly, the fifth outlet 42 is generally rectangular in shape and bounded on three sides by the hood 20, and on a bottom side by the conveyor 24.

Straw in the feed stream FS flowing in the feed direction FD is presented at the inlet 18. As the straw flows into the straw distribution system 14 it is split into the straw streams S1, S2, S3, S4 and SC by a plurality of surfaces which make up the flow distribution system 33 within the chamber 16. The surfaces are best shown in FIGS. 5*a* and 5*c*. The surfaces depend from an upper inside surface of the chamber 16. More particularly the surfaces depend from the liner 31. The surfaces are supported on or by the hood 20.

Two of these surfaces designated, as P1 and P2, meet to form a common edge E1. The common edge E1 lies in a generally vertical plane containing the longitudinal axis 32. The surfaces P1 and P2, and the common edge E1 are part of a plough like structure 44 supported by the hood 20. With reference to the feed direction FD, the edge E1 is at an upstream end of the structure 44 and downstream of the commencement of the first and second openings 34 and 36. The edge E1 is curved in a concave manner. The surfaces P1 and P2 are mutually divergent from each other.

Further surfaces of the flow distribution system 33 (and therefore the straw distribution system 14) include surfaces of a plurality of guide plates 46. One form of guide plate 46 is shown in FIG. 5*d*. The guide plate 46 has a polygonal shape and is substantially flat. At least some of the guide plates 46 are tapered to increase in surface area in the downstream direction of straw flow. Each guide plate 46 is attached to an adjustable mount 48 which include a circular plate 50, and upstanding threaded stud 52, a nut 54 and a crossbar 56.

The circular plate 50 seats in a corresponding recess 51 (see FIG. 6) formed in an inside surface of the upper wall 26. More particularly the recesses 51 are formed in the liner 31. An under surface of the circular plate 50 exposed to the flow of straw is substantially flush with the inside surface of the wall 26/liner 31. The nut 54 can be loosened to allow adjustment of the angle of the guide plates relative to the feed direction FD. The angle can be visualised from outside of the chamber 16 by the angle of the crossbars 56 which are arranged to lie in the same plane as their respective guide plate 46. In this, but not necessarily every, embodiment the shape of the guide plates 46 differs at different locations along the feed direction FD. This is seen in FIGS. 5*b*, 5*c* and 6 where the guide plates 46 are arranged in three successively downstream rows R1, R2 and R3. Row R1 is nearest the inlet 18 and has guide plates of a first shape and area. The guide plates in row R2 are of a different shape and area to those in row R1. The guide plates in row R3 are of a different shape and area to those in both of rows R1 and R2. The maximum vertical height of the surface 46 (which is a measure of their depth of penetration into the chamber 16) increased with distance from the inlet 18.

The straw distribution system 14 is also provided with doors 64, 66, 68 and 70 for the outlets 34, 36, 38 and 40, respectively. The doors can be progressively moved from a shut position which prevents the passage of straw through the corresponding outlet, to a fully open position allowing maximum throughput of straw. An outwardly facing side of each of the doors facing its respective opening is curved or otherwise profiled to assist in directing the corresponding stream to flow out of the chamber 16. For example, with reference to FIG. 6 the doors 66 and 70 which control the openings 36 and 40 have outwardly facing sides 72 that are concavely curved. A similar arrangement can be seen in relation to the doors 64 and 68 in FIGS. 5*c* and 6.

In this embodiment the position of the doors 64-70 can be changed by the operation of corresponding levers L (see FIGS. 5*a* and 5*b*) accessible from the outside of the chamber 16. The doors can be moved incrementally between a fully open position and a fully closed position by positioning the levers L in selected recesses in associated racks R.

As previously mentioned, the straw distribution system 14 also incorporates negative pressure or vacuum sources in the form of fan assemblies 15*x*, 15*y* (hereinafter referred to in general as vacuum sources 15) for inducing or drawing the straw streams S1-SC to flow in the respective flow directions D1-DC. A fan assembly 15*x* is provided at the end of respective chutes 74, 76, 78 and 80, one for each of the openings 34, 36, 38 and 40. Two fans 15*y* are provided at the outlet opening 42 as can be seen in FIGS. 1 and 4. Each chute is in the form of an enclosed channel with a mouth M at a proximal end that is configured to register and engage with a corresponding opening in the chamber 16. A fan assembly 15*x* is provided at the distal end of each of the chutes. Chutes 74 and 76 which can register and engage with openings 34 and 36 respectively are longer than the chutes 78 and 80 which register and engage with the openings 38 and 40.

Thus, in this embodiment there are six discharge points on the SPS 10, each being coincident with the locations of the vacuum sources 15. The straw distribution system 14 seeks to divide the straw feed stream FS into five streams of substantially similar material mass flow rates. The five streams are discharged one through each of the vacuum sources 15. Each of the streams S1, S2, S3 and S4, carry about $\frac{1}{6}^{th}$ of the material mass flow rate of the feed stream FS to the corresponding vacuum sources 15*x* at the discharge points on of the chutes 74, 76, 78 and 80. The stream SC carries about $\frac{1}{3}^{rd}$ (i.e., $\frac{2}{6}^{th}$), of the material flow rate of the feed stream FS, with one half of this being discharged by each of the vacuum sources 15*y* at the outlet 42.

Referring to FIG. 1 each of the chutes is in the general form of a square section tube. Optionally a conveyor 82 is mounted inside each of the chutes or, forms a floor of each of the chutes. When installed, the conveyors 82 assist in transporting straw in the corresponding stream to the vacuum sources 15*x*.

Figure 1A:
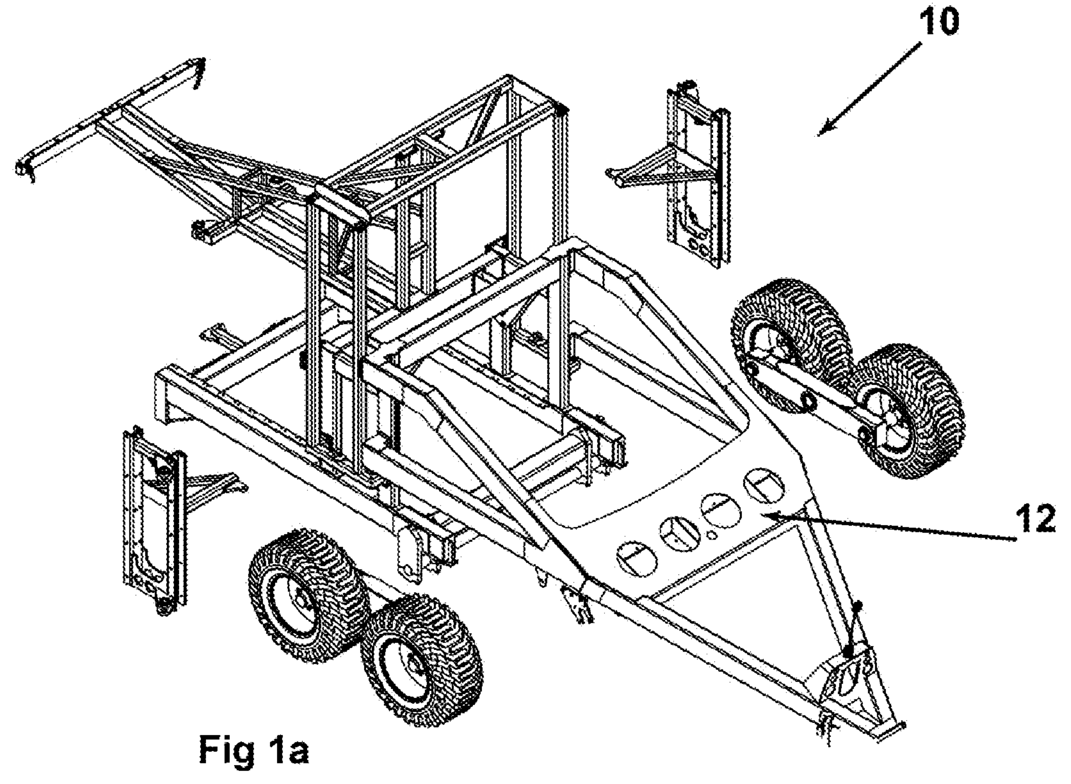
FIG. 1 is an exploded view of an embodiment of the disclosed straw processing system.
Figure 1B:
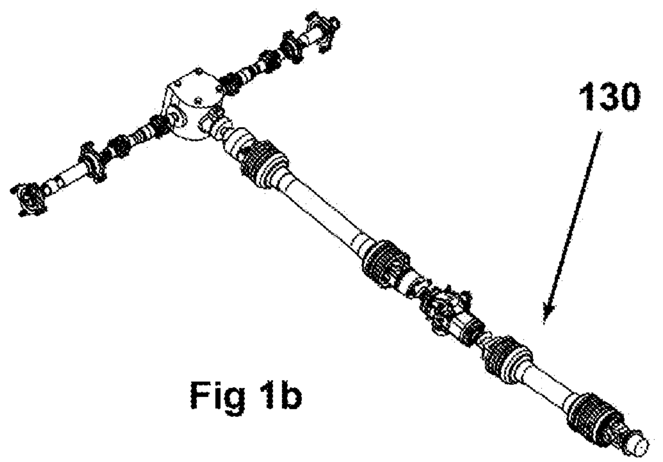
Figure 1C:
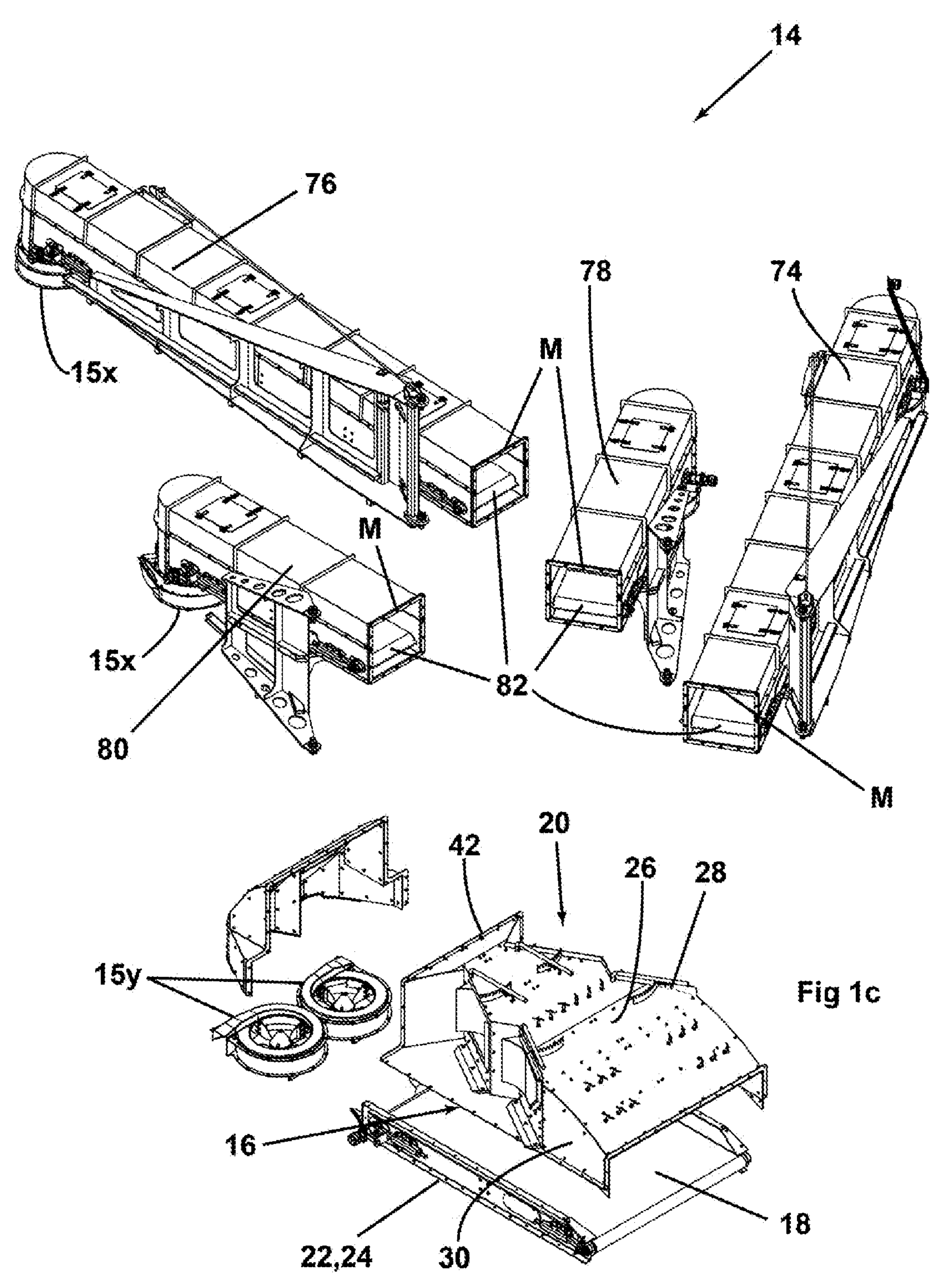
Figure 1D:
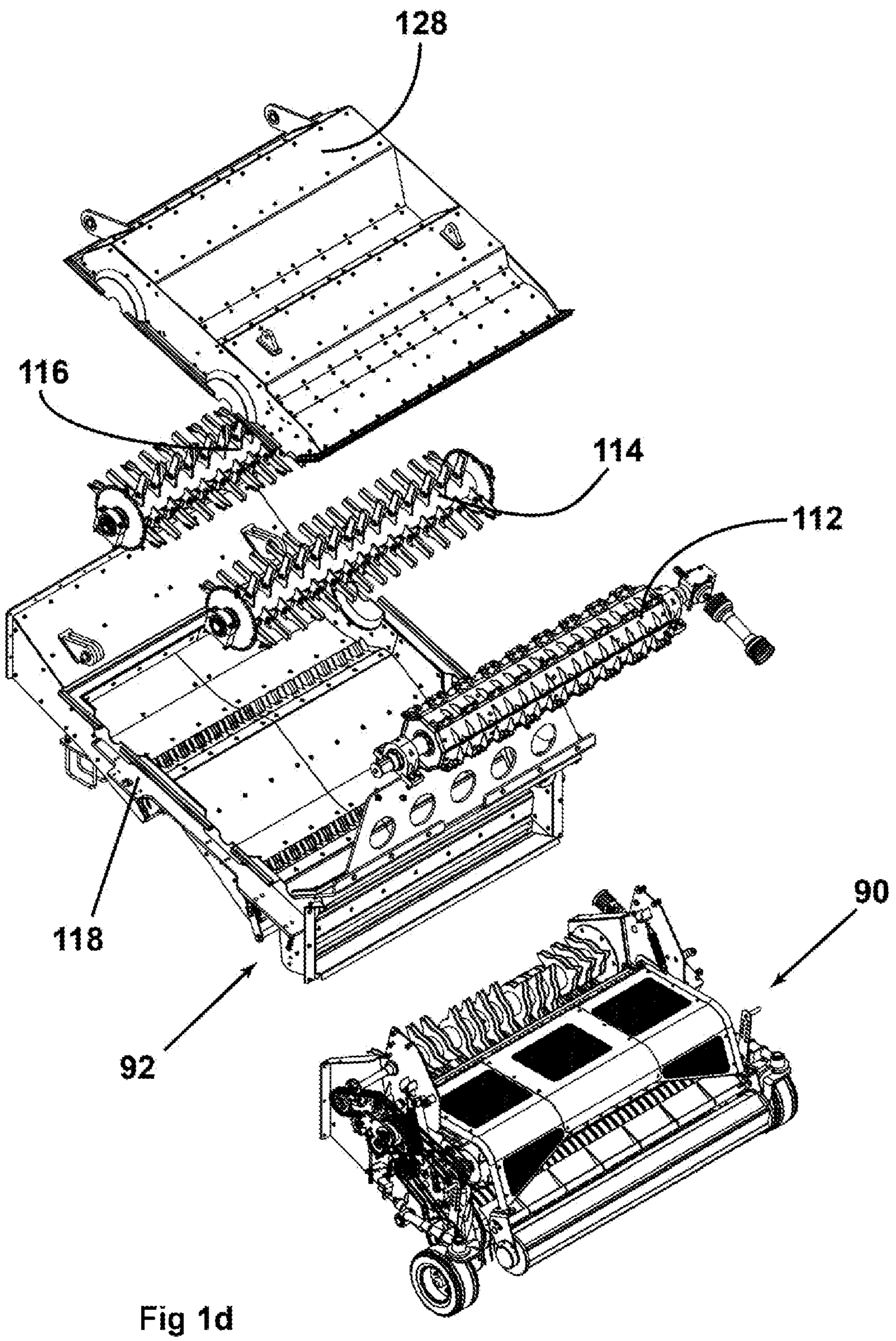
Figures 2, 3:
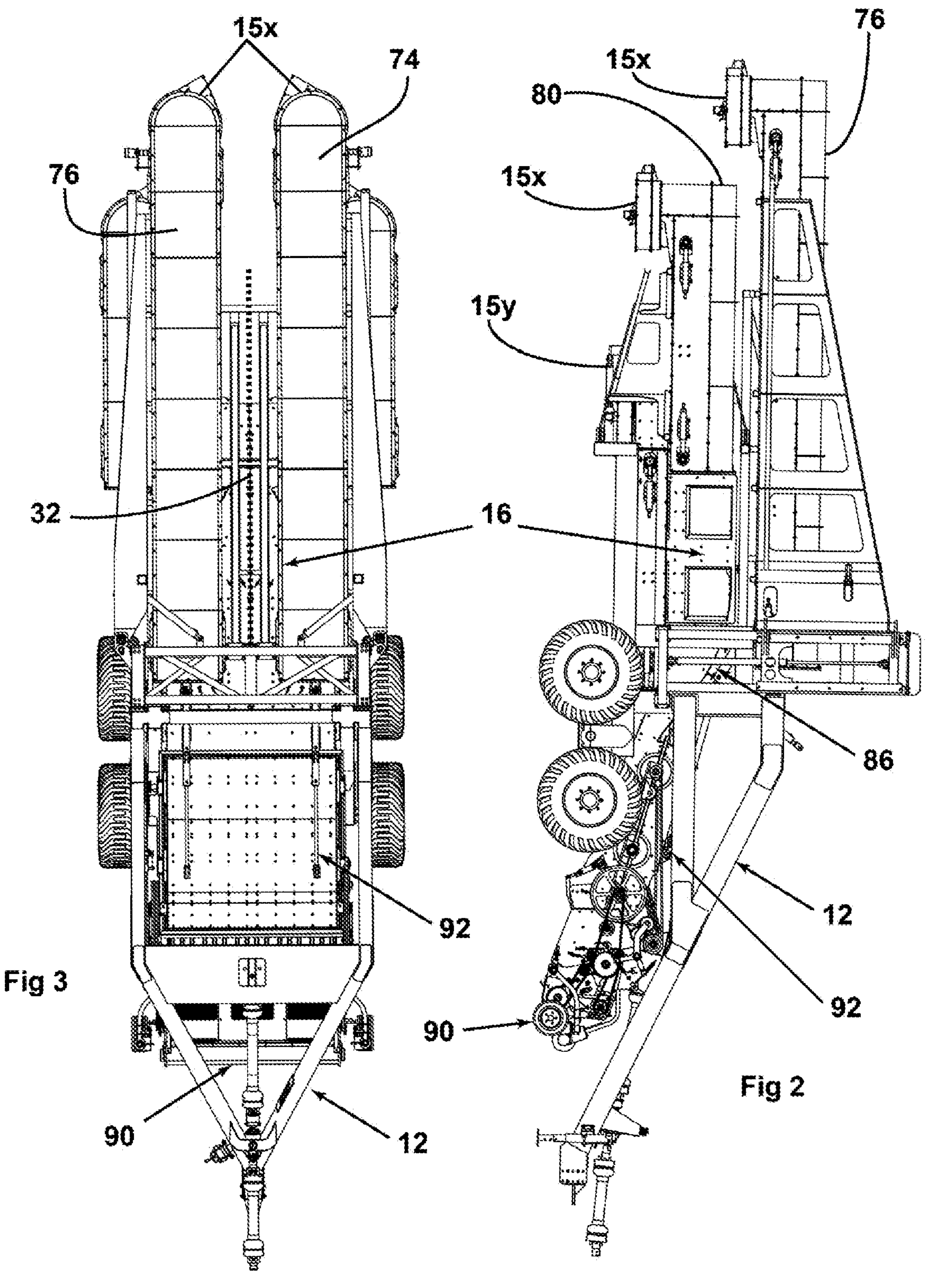
FIG. 2 is a side view of the disclosed straw processing system when in a transport configuration.
FIG. 3 is a plan view of the straw processing system when in the transport configuration.

The chutes can be moved between an operational position shown in FIG. 4 where the mouth M of each chute registers with and abuts against a corresponding opening in the chamber 16; and a transport position shown in FIGS. 2 and 3. When in the transport position the chutes are parallel to each other and parallel to the longitudinal axis 32. The chutes can be moved between the operational and transport positions by way of an automated chute deployment system. The chute deployment system may comprise a plurality of hydraulic rams. The chute deployment system can be operated by controls located on the trailer 12, or alternately by controls within the cab of a vehicle towing or otherwise traversing the trailer 12 over the ground. When in the transport position the chutes lie wholly within the track width of the trailer 12.

The shorter chutes 78 and 80 are hinged to swing about respective vertical axes in a horizontal plane to move between the operational and transport positions. The longer chutes 74 and 76 are moved between the operational and transport positions in a multi-step process. The chutes 74 and 76 are swung about a vertical axis in a horizontal plane by rams 84 shown in FIG. 4 and moved vertically by rams 86 one of which is visible in FIG. 2.

Starting in the storage position shown in FIG. 2 the longer chutes 74 and 76 would first be pivoted about a vertical axis in a horizontal plane by operation of the rams 84 to respective positions where their mouth's M are substantially parallel to the openings 34 and 36 of the chamber 16. Then, the chutes 74 and 76 are lowered vertically by the rams 86 so that the mouths M register with the openings 34 and 36. The chutes 74 and 76 are now in the operational position. This sequence of movement is reversed to move the long chutes 74 and 76 back to the transport position.

The SPS 10 can be operated with the longer chutes 74 and 76 in the transport position and the shorter chutes 78 and 80 in the operational position. This will provide a 12 m spread of the chopped straw rather than the 18 m possible when all of the chutes are in the operational position.

At its forward most end, the straw processing system 10 as a straw pickup assembly 90. The straw pickup assembly 90 operates to pick up windrowed straw from the ground and pass it downstream to a straw chopper 92. The pickup assembly 90 has several main parts or components namely a front draping roller 94, and intake assembly 96 and a pickup transfer chamber 98. The intake assembly 96 has a pickup roller 100 with a plurality of radially extending tines 101. The pickup roller 100 rotates in a direction for so that a tangential vector 102 of the rotary motion at a bottom of the roller points toward the straw chopper 92 and the chamber 16.

Figure 8A:
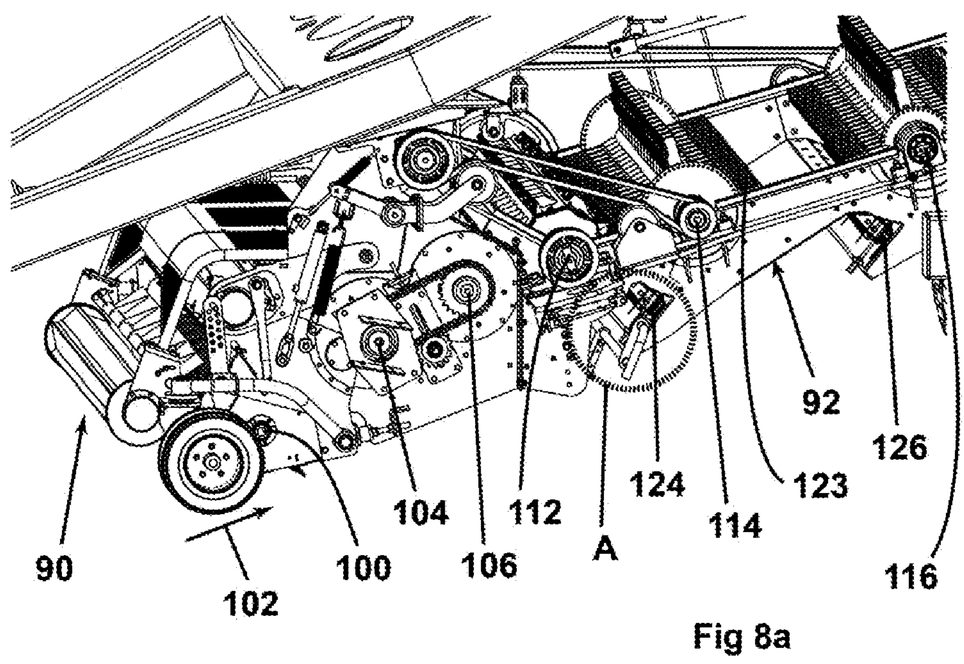
FIG. 8*a* is a representation of a front end of an embodiment of the disclosed straw processing system showing an associated pick-up assembly and the chopper assembly with a cover removed.
Figure 8B:
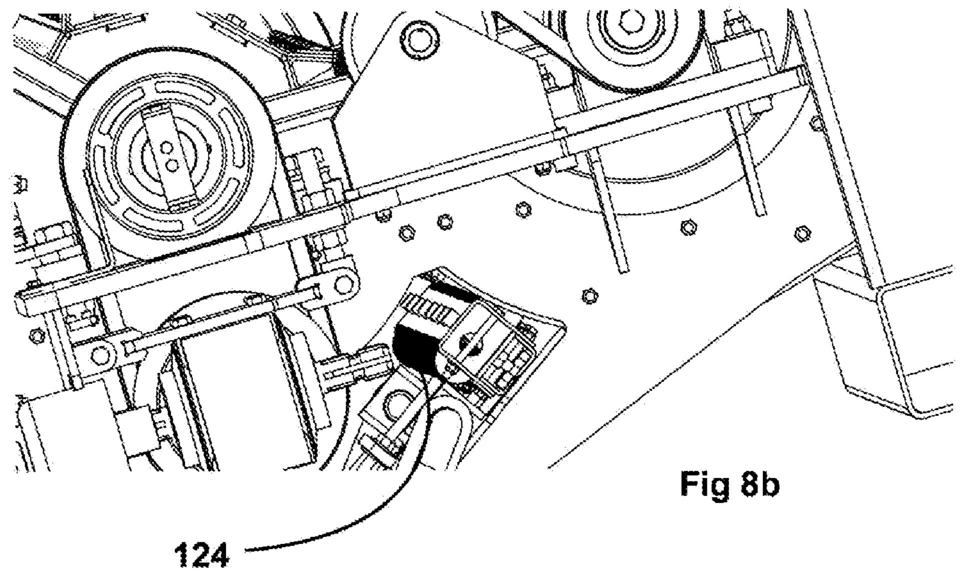
FIG. 8*b* is a view of detail A shown in FIG. 8*a* and illustrating the mounting of a rack of blades on the lower housing of the chopper assembly.
Figure 8C:
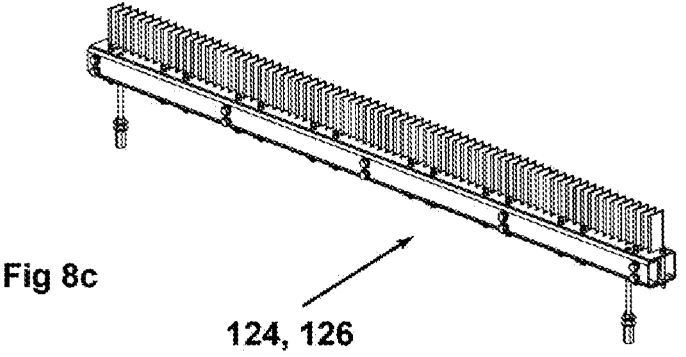
FIG. 8*c* is a representation of the fixed rack of blades incorporated in the chopper assembly.

Straw picked up by the tines of the pickup roller 100 is moved toward the pickup transfer chamber 98 which is provided with feed rollers 104 and 106. The axes of rotation of the rollers 104 and 106 lie in an inclined plane so that the rotation axis of the downstream roller 106 is vertically above that of the roller 104. A comb 108 extends between the rollers 104 and 106 to prevent or at least minimise the volume of straw passing between the rollers and back toward the pickup roller 100. The feed rollers 104 and 106 both rotate in the same direction, which with reference to FIG. 8*a* is in the clockwise direction (as does the pickup roller 100). Thus, the straw picked up by the assembly 90 travels under the rollers 100, 104 and 106.

The front draping roller 94 holds the windrowed straw down and keeps it in contact with the pick-up roller 100.

The pickup assembly 90 may be sourced as a third-party piece of equipment for example from the company Krone UK. Pickup assemblies similar to the assembly 90 are commonly used in hay bailing machines to pick up windrowed straw.

A stone protection system 112 is located between the pickup assembly 90 and the straw chopper 92. Straw picked up by the pickup assembly 90 is fed to the stone protection system 112 which operates to separate hard foreign material such as stones and pieces of metal from the straw. The straw is thrown by the stone protection system 112 into the chopper 92 while the stones another hard material are captured in a sump which can be later opened and emptied.

Figure 8D:
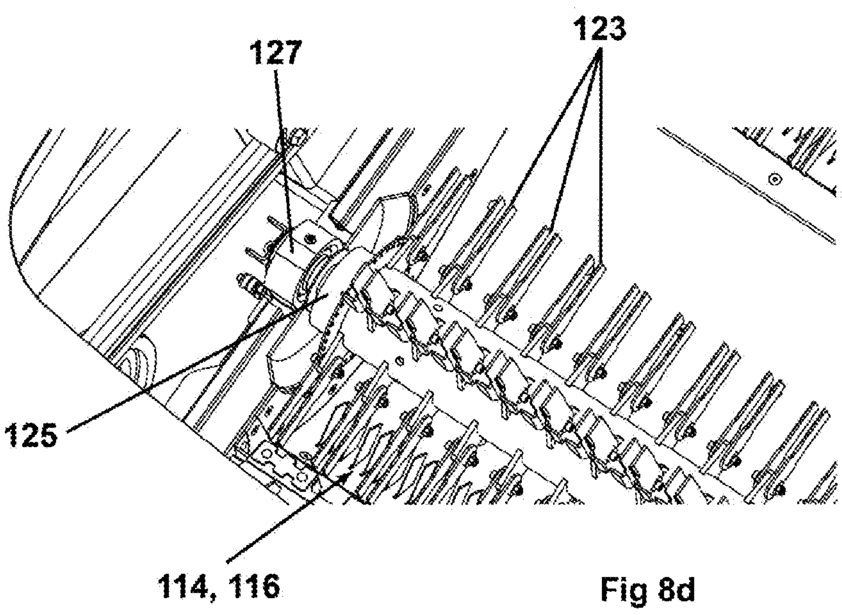
FIG. 8*d* is an enlarged view of a portion of the chopper assembly showing a part of a shredder rotor.

In the illustrated embodiment the chopper 92 comprises two shredder rotors 114 and 116 (FIGS. 1, 8*a* and 8*d*). The rotors 114 and 116 are journaled in a common lower housing 118. The lower housing 118 comprises a floor pan 120 and a floor liner 122 that sits inside the pan 120. The pan and liner are formed with concave recesses for accommodating the rotors 114 and 116. The rotation axes of the rotors 114 and 116 lie on an inclined plane with the rotation axis of the downstream rotor 116 being above that of the downstream rotor 114. Each rotor 114, 116 is provided with a plurality of radially extending blades 123.

The rotor 116 is arranged to be rotated at a slightly faster speed than the rotor 114. This speed differential assists in reducing the risk of clogging by generating a relative negative pressure. A sealing disc 125 (FIG. 8*d*) is located at the axial end of each of the shredder rotors 114, 116 to assist in preventing straw from being forced into bearings 127 of the rotors 114, 116.

The chopper 92 also includes fixed blade racks 124 and 126. The fixed blade racks are supported on the lower housing 118 and extend into concave recesses through which the blades 123 pass when their respective rotors 114, 116 are rotating. Straw is chopped between the rotating blades 123 of the rotors 114, 116; and the fixed blades of the racks 124, 126. The fixed blade racks 124, 126 may be supported on the housing 118 in a manner that enables linear motion toward or away from the shredder rotors 114, 116. In this way the degree of chopping (i.e., the average chop length) and the straw through put can be controlled. The linear motion of the racks 124, 126 can be performed manually prior to operation of the SPS 10, or by the use of actuators controlled from a cab of a vehicle towing or otherwise carrying the SPS 10. To this end various sensors or measurement devices may be located in the feed stream of the chopped straw as it passes from the chopper 92 to the inlet 18 of the straw distribution system 14 to measure the average length of the chopped straw and the volume of chopped straw per unit time.

The blades 123 of the chopper 92 may also be configured to create an airflow in the general direct upward and rearward direction, so the straw flowing into the inlet 18 is directed toward an upper region of the chamber 16. A cover 128 (FIG. 1) is coupled to the lower housing 118. The cover may be opened and closed by the operation of actuators including for example hydraulic rams to allow access into the chopper 92 for maintenance and service.

The chopped straw entering the inlet 18 is then divided into the straw stream is S1, S2, S3, S4 and SC by operation of the straw distribution system 14 described above. The straw in streams S1, S2, S3 and S4 is diverted to flow out of the outlets 34, 36, 38 and 40 into the chutes 74, 76, 78 and 80 respectively. The flow of straw toward the respective discharge points of each of the chutes is assisted by the generation of negative pressure by the vacuum sources 15*x* at the end of each of the chutes. The vacuum sources 15*x* subsequently throw the straw from the respective chute. The chopped straw which is not diverted into the chutes 74-80 falls onto the conveyor 24 in the chamber 16 and is discharged by vacuum sources 15*y* at the distal end of the conveyor 24.

Power for operation of the STS 10 is provided by a mechanical drive train 130 that can be coupled to a PTO of the tractor or other vehicle towing the trailer 12.

Now that an embodiment has been described, it should be appreciated that the straw processing system 10 maybe embodied in many other forms. For example, the surfaces P1 and P2 on the plough like structure 44 may be adjustable in depth for example by being able to be lifted or lowered through slots in the cover 20. Alternately the included angle between the surfaces P1 and P2 may be adjustable by spreading them apart or bringing them closer together. This may be done for example by the use of actuators controlled from inside the cabin of a vehicle towing the SPS 10. Similarly, actuators (for example hydraulic or electric) can be used in place of the levers L to enable control of the position of the doors 66, 68, 70 and 72. In yet a further variation, adjustable discharge deflectors may be provided on each of the vacuum sources 15 to allow control of a lateral throw angle of the vacuum sources 15. The discharge deflectors may be in the form of elongated plates which are hinged to a casing of the vacuum sources 15 at a discharge opening and can be swung toward or away from the opening. The discharge deflectors may also be provided with an outwardly and downwardly sloping portion for directing at least part of the discharge in a downward direction.

Figure 7A:
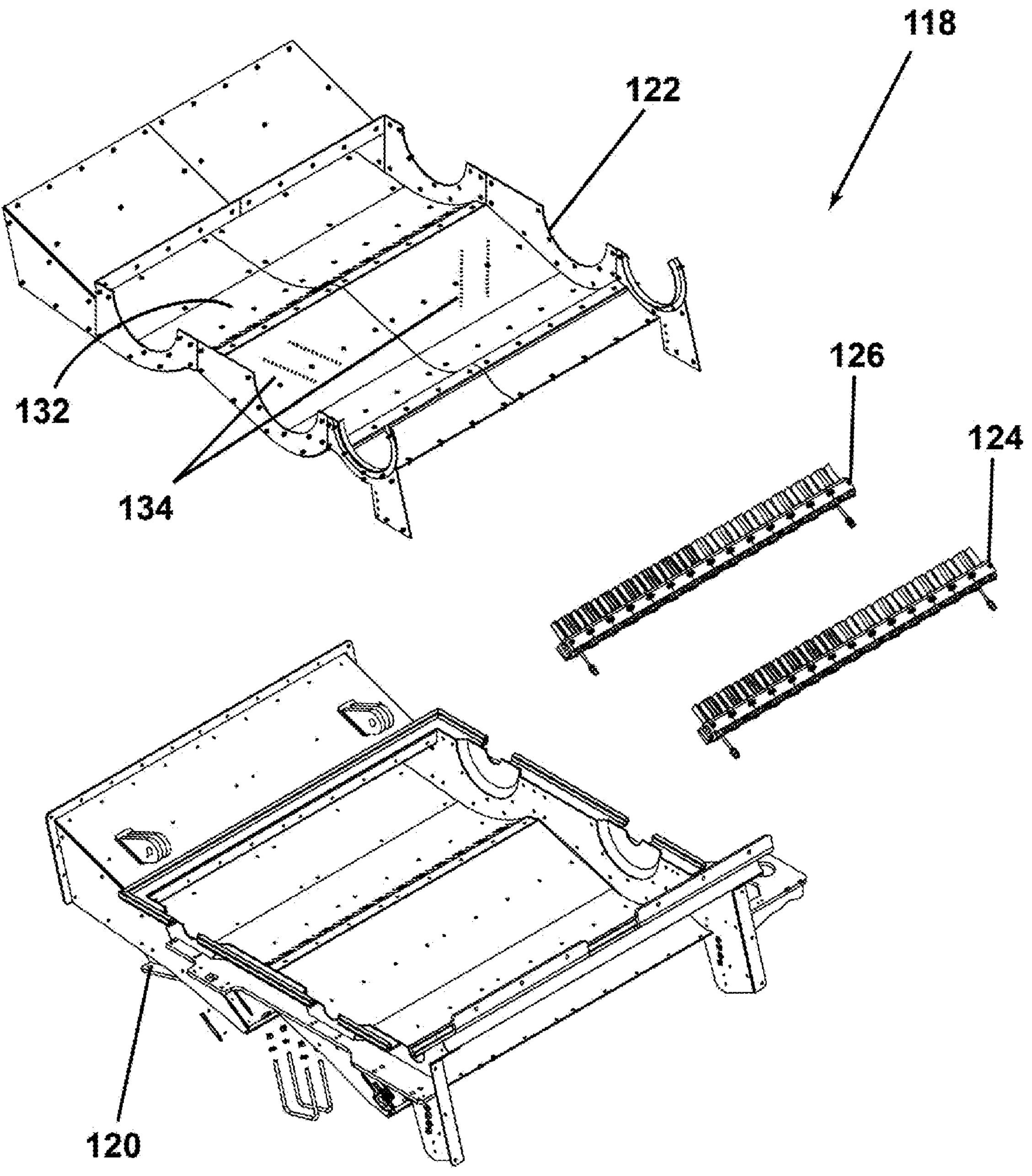
FIG. 7*a* is an exploded view of a lower housing of a chopper assembly incorporated in an embodiment of the disclosed straw processing system.
Figure 7B:
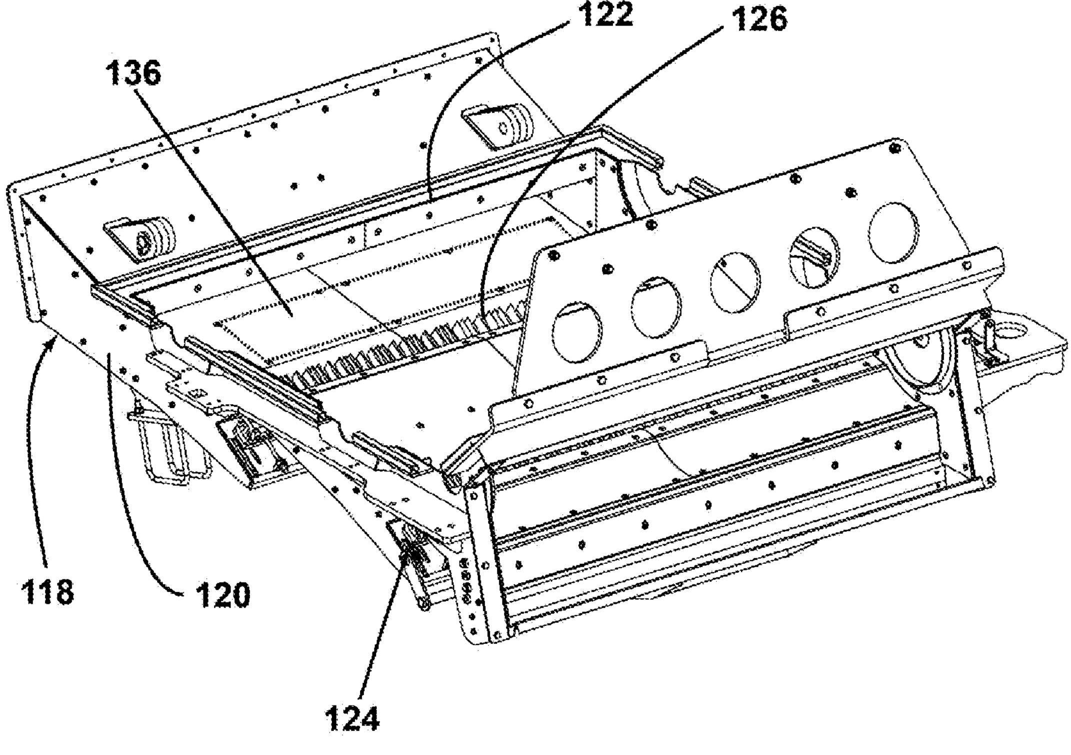
FIG. 7*b* is an assembled view of the lower housing of the chopper assembly.

In a further modification the exposed surface 132 of the floor liner 122 may be provided with deflection plates 134 (shown in phantom line in FIG. 7*a*) to direct chopped straw in an outward direction as it flows from the first rotor 124 to the second rotor 126. Also, a ramp 136 (FIG. 7*b*) with a controllable pitch or inclination can be incorporated in the liner 122, or fitted to the liner 122. The purpose of the ramp 138 is to control the trajectory of the chopped straw as it flows into the opening 18 of the chamber 16. The angle of the deflection plates 134 and/or the inclination of the ramp 138 may be controlled by respective actuators operated from a cab of a vehicle towing the straw processing system 10.

The configuration and arrangement of blades 123 on the rotors 114 and 116 may be different from each other. In this regard the blades 4123 may be provided in two basic forms, a “straight blade” and a “thrower blade”. In a straight blade the entirety of the blade lies in a single plane that includes a straw cutting edge. A thrower blade is in essence a straight blade with an added portion that extends perpendicular to the plane of the cutting edge. The added portion acts as a fan or thrower which assists in transporting the chopped straw in the downstream direction toward the straw distribution system 14. In one possible arrangement all of the blades of the upstream rotor 114 may comprise straight blades whereas the downstream rotor 116 may be provided with one or more thrower blades for example 30%, or 50%, or 75%, or 100% thrower blades. In another arrangement both the rotors may include a number of thrower blades (where the number may be zero) but in any event the number of thrower blades in the downstream rotor 116 is more than the number of thrower blades in the upstream rotor 114.

In the claims which follow, and in the preceding description, except where the context requires otherwise due to express language or necessary implication, the word “comprise” and variations such as “comprises” or “comprising”

are used in an inclusive sense, i.e. to specify the presence of the stated features but not to preclude the presence or addition of further features in various embodiments of the system and method as disclosed herein.

The invention claimed is:

1. A straw processing system comprising:

a straw pickup assembly;

a straw chopper, the straw pickup assembly operable to pick up windrowed straw from the ground and pass it to the straw chopper for producing a straw feed stream flowing in a feed direction; and a straw distribution system having: a chamber with a feed inlet for receiving the straw feed stream; a central outlet located downstream of the feed inlet in the feed direction; a first outlet wherein the central outlet is downstream of the first outlet in the feed direction; and a first chute selectively moveable between an operational position where the first chute is in communication with the first outlet to enable straw to flow along the first chute to an associated discharge point at which straw is discharged from the straw distribution system; and a transport position where a longitudinal axis of the first chute is substantially parallel to the feed direction;

wherein the straw distribution system is operable to divert at least a first fraction of straw from the straw feed stream received in the feed inlet to flow into the first outlet and through the first chute in a first direction which is divergent from the feed direction, and wherein the central outlet discharges a fraction of the straw feed stream that continues to flow in the feed direction from an associated discharge point.

2. The straw processing system of claim 1, wherein the straw distribution system includes a second outlet formed in the chamber, and a second chute selectively moveable between an operational position where the second chute is in communication with the second outlet to enable straw to flow along the second chute to an associated discharge point at which straw is discharged from the second chute and the straw distribution system; and a transport position where a longitudinal axis of the second chute is substantially parallel to the feed direction; wherein the central outlet is downstream of the second outlet in the feed direction; and wherein the straw distribution system is operable to divert at least a second fraction of the straw from the straw feed stream to flow into the second outlet and through the second chute in a second direction which is divergent from the first direction and the feed direction.

3. The straw processing system of claim 2, wherein the straw distribution system includes a third outlet formed in the chamber, and a third chute selectively moveable between an operational position where the third chute is in communication with the third outlet to enable straw to flow along the third chute to an associated discharge point at which straw is discharged from the third chute and the straw distribution system; and a transport position where a longitudinal axis of the third chute is substantially parallel to the feed direction; wherein the central outlet being downstream of the third outlet in the feed direction; and wherein the straw distribution system is operable to divert at least a third fraction of the straw from the straw feed stream to flow into the third outlet and through the third chute in a third direction which is divergent from the feed direction.

4. The straw processing system of claim 3, wherein the straw distribution system includes a fourth outlet formed in the chamber, and a fourth chute selectively moveable between an operational position where the fourth chute is in communication with the fourth outlet to enable straw to flow along the fourth chute to an associated discharge point at which straw is discharged from the fourth chute and the straw distribution system; and a transport position where a longitudinal axis of the fourth chute is substantially parallel to the feed direction; wherein the central outlet being downstream of the fourth outlet in the feed direction; and wherein the straw distribution system is operable to divert at least a fourth fraction of the straw from the straw feed stream to flow into the fourth outlet and through the fourth chute in a fourth direction which is divergent from the feed direction.

5. The straw processing system of claim 4, wherein the first direction and the third direction are substantially parallel to each other.

6. The straw processing system of claim 4, wherein the second direction and the fourth direction are substantially parallel to each other.

7. The straw processing system of claim 1, wherein the chamber comprises opposing side walls between the feed inlet and the central outlet and wherein the first outlet is formed in one of the opposing side walls.

8. The straw processing system of claim 1, wherein the straw distribution system comprises a plurality of surfaces depending from an upper inside surface of the chamber.

9. The straw processing system of claim 8, wherein at least two of the surfaces meet to form a common edge.

10. The straw processing system of claim 9, wherein the at least two of the surfaces are mutually diverted from the common edge when viewed downstream with reference to the feed direction.

11. The straw processing system of claim 8, wherein the plurality of surfaces comprises a plurality of spaced apart guide plates depending from the upper inside surface of the chamber.

12. The straw processing system of claim 11, wherein the guide plates are adjustably supported on the chamber in a manner to allow adjustment of an orientation of the guide plates relative to the feed direction.

13. The straw processing system of claim 12, further comprising an adjustment mechanism operable from an outside of the chamber for adjusting the orientation of the guide plates.

14. The straw processing system of claim 4, further comprising a plurality of vacuum sources each in fluid communication with a respective outlet, wherein the vacuum sources are operable to draw a fraction of straw associated with the respective outlet to respective discharge points associated with the respective chutes and the central outlet from where the straw in the straw feed stream is ejected from the straw processing system.

15. The straw processing system of claim 14, wherein at least one of the discharge points is laterally offset from a line coincident with the feed direction.

16. The straw processing system of claim 4, wherein each chute is provided with a conveyor arranged to assist in transporting straw to the discharge point associated with that chute.

17. The straw processing system of claim 4, further comprising a chute deployment system operable to selectively move the chutes between their respective operational positions and transport positions.

18. The straw processing system of claim 1, wherein the straw chopper comprises at least one shredder rotor arranged to chop straw and produce the straw feed stream received by the feed inlet of the chamber, wherein the at least one shredder rotor is rotatable about an axis perpendicular to the feed direction.

19. The straw processing system of claim 18, wherein the straw chopper comprises a first shredder rotor and a second shredder rotor arranged to rotate about mutually parallel axes and wherein the second shredder rotor is downstream of the first shredder rotor whereby straw chopped by the first shredder rotor subsequently passes to the second shredder rotor.

20. The straw processing system of claim 18, wherein the at least one shredder rotor includes a second shredder rotor that rotates at a speed greater than a first shredder rotor.

21. The straw processing system of claim 19, wherein the first shredder rotor is provided with a first arrangement of blades and the second shredder rotor is provided with a second arrangement of blades, wherein the first arrangement of blades is different to the second arrangement of blades.

22. The straw processing system of claim 18, wherein the straw chopper comprises a housing and a replaceable wear liner seated in the housing.

23. The straw processing system of claim 22, wherein the straw chopper comprises a cover operable to move between a closed position where the cover closes the housing, and an opened position where the cover is moved away from the housing to allow access to the at least one shredder rotor.

24. The straw processing system of claim 19, wherein the straw chopper includes a plurality of deflector plates arranged to deflect straw chopped by the first shredder rotor towards respective ends of the second shredder rotor.

25. The straw processing system of claim 18, further comprising a ramp arranged to deflect straw chopped by the straw chopper toward an upper region of the feed inlet.

26. A straw processing system comprising:

a straw pickup assembly;

a straw chopper, the straw pickup assembly operable to pick up windrowed straw from the ground and pass it to the straw chopper for producing a straw feed stream flowing in a feed direction; and a straw distribution system having: a chamber with a feed inlet for receiving the straw feed stream, a central outlet located downstream of the feed inlet in the feed direction, and, first, second, third and fourth outlets, the central outlet being downstream of the first, second, third, and fourth outlets in the feed direction;

wherein the straw distribution system is operable to divert a first fraction of straw from the straw feed stream received in the feed inlet to flow into the first outlet in a first direction, a second fraction of straw from the straw feed stream received in the feed inlet to flow into the second outlet in a second direction, a third fraction of straw from the straw feed stream received in the feed inlet to flow into the third outlet in a third direction, and a fourth fraction of straw from the straw feed stream received in the feed inlet to flow into the fourth outlet in a fourth direction, wherein each of the first, second, third, and fourth directions is divergent from the feed direction, and wherein the central outlet discharges a fraction of the straw feed stream that continues to flow in the feed direction; and a plurality of vacuum sources each in fluid communication with a respective outlet, wherein the vacuum sources are operable to draw a fraction of straw associated with the respective outlet to respective discharge points from where the straw in the straw feed stream is ejected from the straw processing system.

27. The straw processing system of claim 26, wherein at least one of the discharge points is laterally offset from a line coincident with the feed direction.

28. The straw processing system of claim 26, further comprising a plurality of chutes wherein each chute extends from a corresponding outlet, and at least one vacuum source is provided at an end of each chute distal the corresponding outlet, and wherein the end of each chute forms an associated one of the discharge points.

29. The straw processing system of claim 28, wherein each chute is provided with a conveyor arranged to assist in transporting straw to the discharge point associated with that chute.

30. The straw processing system of claim 28, further comprising a chute deployment system operable to selectively move the chutes between an operational position where the chutes are in communication with their respective outlets to enable straw to flow along a chute to an associated discharge point; and a transport position where a longitudinal axis of a corresponding chute is substantially parallel to the feed direction.

* * * * *